United States Patent [19]
Schmid et al.

[11] Patent Number: 6,024,284
[45] Date of Patent: Feb. 15, 2000

[54] WIRELESS BAR CODE SCANNING SYSTEM

[75] Inventors: William M. Schmid, Auburn; James R. Behrens, Macedon, both of N.Y.

[73] Assignee: PSC Inc., Webster, N.Y.

[21] Appl. No.: 09/137,510

[22] Filed: Aug. 20, 1998

Related U.S. Application Data

[63] Continuation of application No. 08/815,116, Mar. 11, 1997, Pat. No. 5,825,009.

[51] Int. Cl.[7] ........................................................ G06K 7/10
[52] U.S. Cl. ........................................................ 235/462.46
[58] Field of Search ........................ 235/462.46, 462.01, 235/472.01, 454

[56] References Cited

U.S. PATENT DOCUMENTS

| | | | |
|---|---|---|---|
| 4,916,441 | 4/1990 | Gombrich | 340/712 |
| 5,142,128 | 8/1992 | Perkin et al. | 235/375 |
| 5,307,297 | 4/1994 | Iguchi et al. | 364/708.1 |
| 5,414,624 | 5/1995 | Anthonyson | 364/424.01 |
| 5,434,401 | 7/1995 | Bauser | 235/454 |
| 5,528,025 | 6/1996 | Swintek | 235/472 |
| 5,665,956 | 9/1997 | La et al. | 235/472 |
| 5,708,418 | 1/1998 | Ushida et al. | 340/568 |
| 5,796,091 | 8/1998 | Schmidt et al. | 235/472 |
| 5,825,009 | 10/1998 | Schmid et al. | 235/462 |

*Primary Examiner*—Michael G Lee
*Assistant Examiner*—Daniel H. Sherr
*Attorney, Agent, or Firm*—Foley & Lardner

[57] ABSTRACT

A wireless scanning system for a bar code scanner and a personal computer. The bar code scanner sends raw bar code data via a wireless connection to the personal computer. The personal computer decodes the raw bar code data, and sends the digitized version of the raw bar code data to a keyboard buffer, in order to simulate data from the keyboard at the personal computer based on the raw bar code data.

2 Claims, 3 Drawing Sheets

WIRELESS BAR CODE SCANNING SYSTEM

This application is a continuation of application Ser. No. 08/815,116, filed Mar. 11, 1997 now U.S. Pat. No. 5,825,009.

BACKGROUND OF THE INVENTION

1. Field of the Invention

The invention relates to a wireless bar code scanner which transmits bar code data to a personal computer. In particular, the invention relates to a wireless bar code scanner which transmits raw bar code data to a personal computer.

2. Description of the Related Art

Bar codes are used in a wide variety of applications for retrieving information from objects, such as price. In this respect, bar code scanners are of widespread use in grocery stores and department stores, for both inventory control and for point-of-sales transactions.

A bar code normally includes several bar code characters. A bar code character is a group of lines (bars) and spacings that represent a single number or letter. A bar code symbol is a collection of several bar code characters which represent an identification of a particular object. The lines of the bar code can vary in a range, for example, from about ⅛" to 1" in height, and from about 1 to 50 mils in thickness. The spacings between the lines making up the bar code may be of various widths, with the variations in the spacing being one determination of the type of bar code characters making up the bar code.

Typically, bar codes are read by illuminating the bars and spacings in a sequential manner, with the bars absorbing light and the background spacings reflecting light. This results in a pattern of reflections and nonreflections that is sensed by a light detecting circuit resident in the bar code scanner. The light detecting circuit provides an input to a digital processor, which interprets the bar code into a digital word.

The ability of a bar code scanner to read a bar code satisfactorily is dependent on its resolution. This resolution defines the ability of the bar code scanner to read the narrowest bar or space. Resolution is dependent on the size and sharpness of the spot of light that illuminates the bar code.

Once a bar code has been read by the scanner, the raw data obtained from the reflected light off of the bar code symbol is processed by circuitry inside the bar code scanner. The raw data may be subject to a first and/or second differential circuit, which causes the bar/space transitions to be more clearly set out in the raw bar code data. Additionally, the raw data is usually subject to amplification, as well as to being decoded by a decoder in order to obtain a digital representation of the bar code symbol.

Conventional systems also allow for a bar code symbol to be scanned by a bar code scanner to provide scanned data, wherein the scanned data is sent to another device for processing of the data. For example, U.S. Pat. No. 5,307,297, entitled "Data Processor With Wireless Auxiliary Input Apparatus", issued to S. Iguchi et al., discloses a data processor which has a receiver for receiving wireless signals on an external side wall of the data processor. Wireless signals are received from various devices, including a bar code scanner. U.S. Pat. No. 5,142,128, entitled "Oilfield Equipment Identification Apparatus", issued to G. Perkin et al., discloses an apparatus for identifying oil field equipment. A portable encapsulated passive circuit capable of transmitting an identification code is affixed to a piece of oil field equipment, and the circuit is activated by a reader, which receives and decodes the identification code and transmits it to a central computer.

U.S. Pat. No. 4,916,441, entitled "Portable Handheld Terminal", issued to P. Gombrich, discloses a network system used in a patient health care system. A bar code reader is used in the network, and an RF modem is provided for wireless transmission of information from the bar code reader to devices on the network.

U.S. Pat. No. 5,414,624, entitled "Automatic Vehicle Parking System", issued to R. Anthonyson, discloses an automated vehicle parking system. A sensor is used in the system, and it sends data to a personal computer via wireless means. The sensor is able to identify a vehicle based on its vehicle identification number.

U.S. Pat. No. 5,426,423, entitled "Process and Device for Registering and Checking Items", issued to P. Raimbault et al., discloses a bar code reader which reads a bar code, and which transfers the read bar code by a frequency signal to computer elements.

U.S. Pat. No. 5,434,401, entitled "Signal Coupler", issued to P. Bauser, discloses communications between a photovoltaic generator and a microcontroller via the infrared spectrum, ultra violet spectrum or visible light.

The above-mentioned patents are each incorporated herein by reference.

In each of the above-mentioned conventional devices, once the data is sent via wireless means to another location, the other location performs processing on that data in order to determine the data corresponding to the scanned object. However, in accordance with the invention, other types of uses of the raw data at the other location may be achieved.

SUMMARY OF THE INVENTION

It is therefore an object of the invention to be able to send raw bar code data from a remote bar code scanner, and to utilize that data at a central computer in order to simulate data from keyboard at the central computer.

The above-mentioned object and other objects are accomplished by a bar code scanning and decoding apparatus. The apparatus includes a bar code scanner and a computer. The bar code scanner includes scanning means for scanning a bar code symbol, first receiving means for receiving a signal return from the scanned bar code symbol, and transmitting means for transmitting the signal return via over-the-air transmission. The computer is located separate from the bar code scanner. The computer includes a keyboard buffer for storing digital representations of data from the keyboard, second receiving means for receiving the signal return sent from the bar code scanner, decoding means for decoding the received signal return and for obtaining a digital representation of the received signal return as a result of the decoding, and means for transferring the digital representation of the received signal return from the decoding means to the keyboard buffer in order to simulate data from the keyboard representative of the scanned bar code symbol.

The above-mentioned objects and other objects are also accomplished by a bar code scanning and decoding apparatus, which includes a bar code scanner and a computer. The bar code scanner includes a scanner configured to scan a bar code symbol, a first receiver configured to receive a signal return from the scanned bar code symbol, and a transmitter connected to the first receiver and configured to transmit the signal return via over-the-air transmission. The computer is located separate from the bar code scanner. The computer includes a keyboard, a keyboard buffer for storing digital representations of data from the keyboard, a second receiver configured to receive the signal return sent from the bar code scanner, and a decoder connected to the second receiver and the keyboard and configured to decode the received signal return and to obtain a digital representation of the received signal return as a result of the decoding. The digital representation of the received signal return from the decoder is output to the keyboard buffer in order to simulate data from the keyboard representative of the scanned bar code symbol.

The above-mentioned object and other objects are also accomplished by a bar code scanning and decoding apparatus, which includes a remotely-located bar code scanner and a centrally-located computer. The remotely-located bar code scanner includes scanning means for scanning a bar code symbol, first receiving means for receiving a signal return from the scanned bar code symbol, and transmitting means for transmitting the signal return via over-the-air transmission. The centrally-located computer includes an external housing, a keyboard connected to the external housing, a keyboard buffer for storing digital representations of data from the keyboard, second receiving means, within the external housing, for receiving the signal return sent from the bar code scanner, decoding means, within the external housing, for decoding the received signal return and for obtaining a digital representation of the received signal return as a result of the decoding, and transferring means, within the external housing, for transferring the digital representation of the received signal return from the decoding means to the keyboard buffer in order to simulate data from the keyboard representative of the scanned bar code symbol.

BRIEF DESCRIPTION OF THE DRAWINGS

These and other objects and advantages of the invention will become more fully apparent from the following detailed description when read in conjunction with the accompanying drawings with like reference numerals indicating corresponding parts throughout, and wherein.

DETAILED DESCRIPTION OF THE PREFERRED EMBODIMENTS

Figure 1:
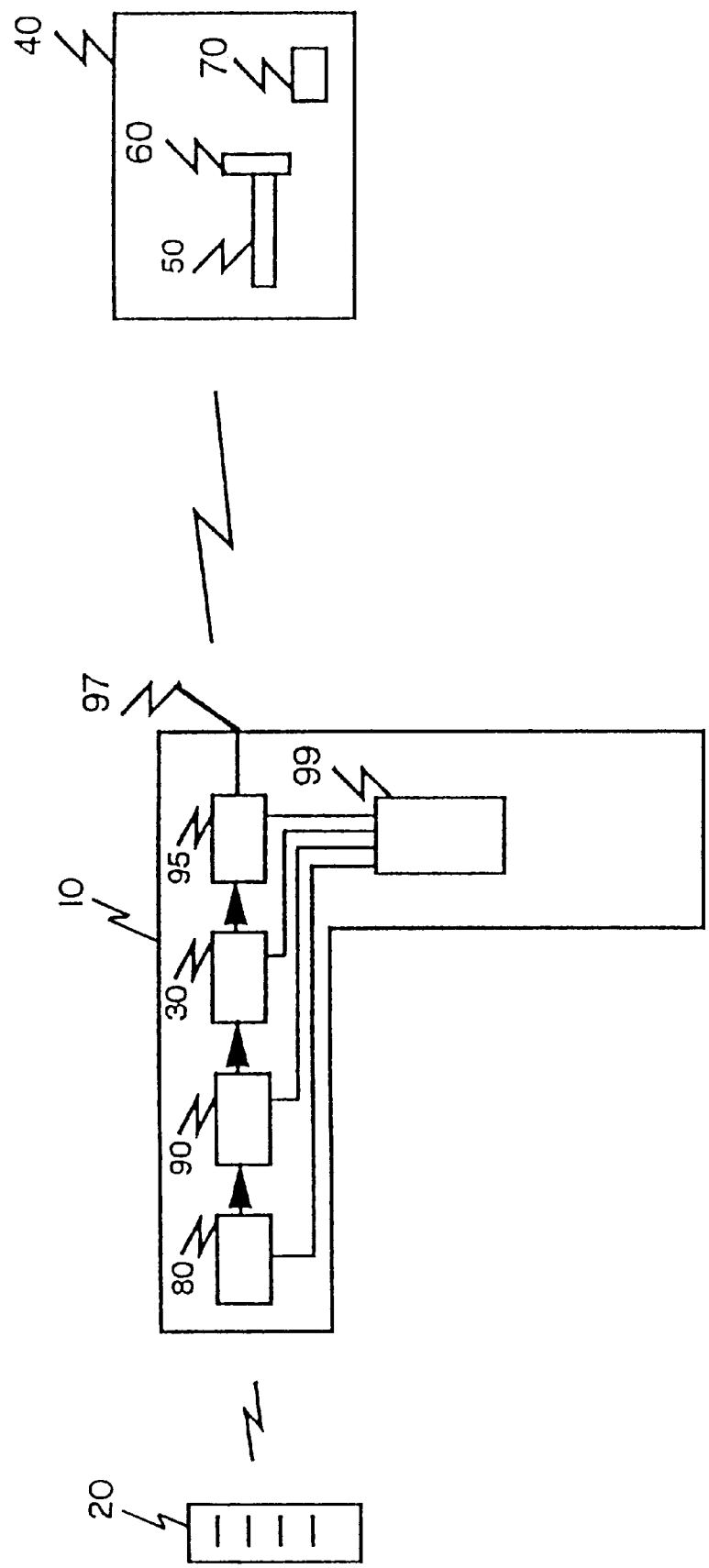
FIG. 1 is a diagram showing a first embodiment of the invention with a remote bar code scanner and a personal computer with a receiver housed in an expansion slot.

Referring now to FIG. 1, a first embodiment of the system according to the invention will be described in detail hereinbelow. In the system, a bar code scanner 10 is used to scan a bar code symbol 20. Once the bar code scanner 10 has successfully scanned the bar code symbol 20, the raw bar code data received by the bar code scanner 10 is digitized, and the digitized data is stored in a memory 30 internal to the bar code scanner 10. In the first embodiment, the return data which corresponds to light reflected off of the bar code symbol is received by a photodiode detector 80, and then the raw data is sent to a digitizer 90. The digitized data is then stored in a memory 30.

At a later time, the data is retrieved from the memory 30, modulated by modulator 95, and sent via antenna 97 to a personal computer 40 which is located separate from the bar code scanner 10. The "later time" may correspond to a particular time frame which the personal computer 40 is in a receiving mode, such as a particular time division multiple access (TDMA) time slot. Alternatively, the digitized data may be immediately sent out to the personal computer 40 as soon as it is digitized by the digitizer 80, in which case a memory 30 is not needed. A control unit 99 at the bar code scanner 10 controls the transmission (and reception, if required) of data to the personal computer 40.

The means of wireless transmission may be via radio frequency signals, ultraviolet signals, infrared signals, or ultrasonic transmission. Generally, information may be sent over-the-air between devices which are not separated too much from each other (e.g., less than approximately 100 feet away). Additionally, the data may be sent via data packets, or as a continuous stream of data, depending upon the amount of transmission signal processing which is done at the bar code scanner 10. The data may also be subject to forward error correction (FEC), via an FEC encoder (not shown) resident in the bar code scanner 10. One such bar code scanner that can be utilized in the system according to the invention is described in U.S. patent application Ser. No. 08/331,434, entitled "Bar Code Reading and Data Collection Unit With Ultrasonic Wireless Data Transmission", by C. La and R. Boyd, which is assigned to PSC Inc., and which is incorporated herein by reference.

The raw bar code data is sent to the personal computer 40, which receives the data over-the-air via a receiver board 50. In the preferred embodiment, the receiver board 50 is connected to an expansion slot 60 in the personal computer 40.

Figure 2:
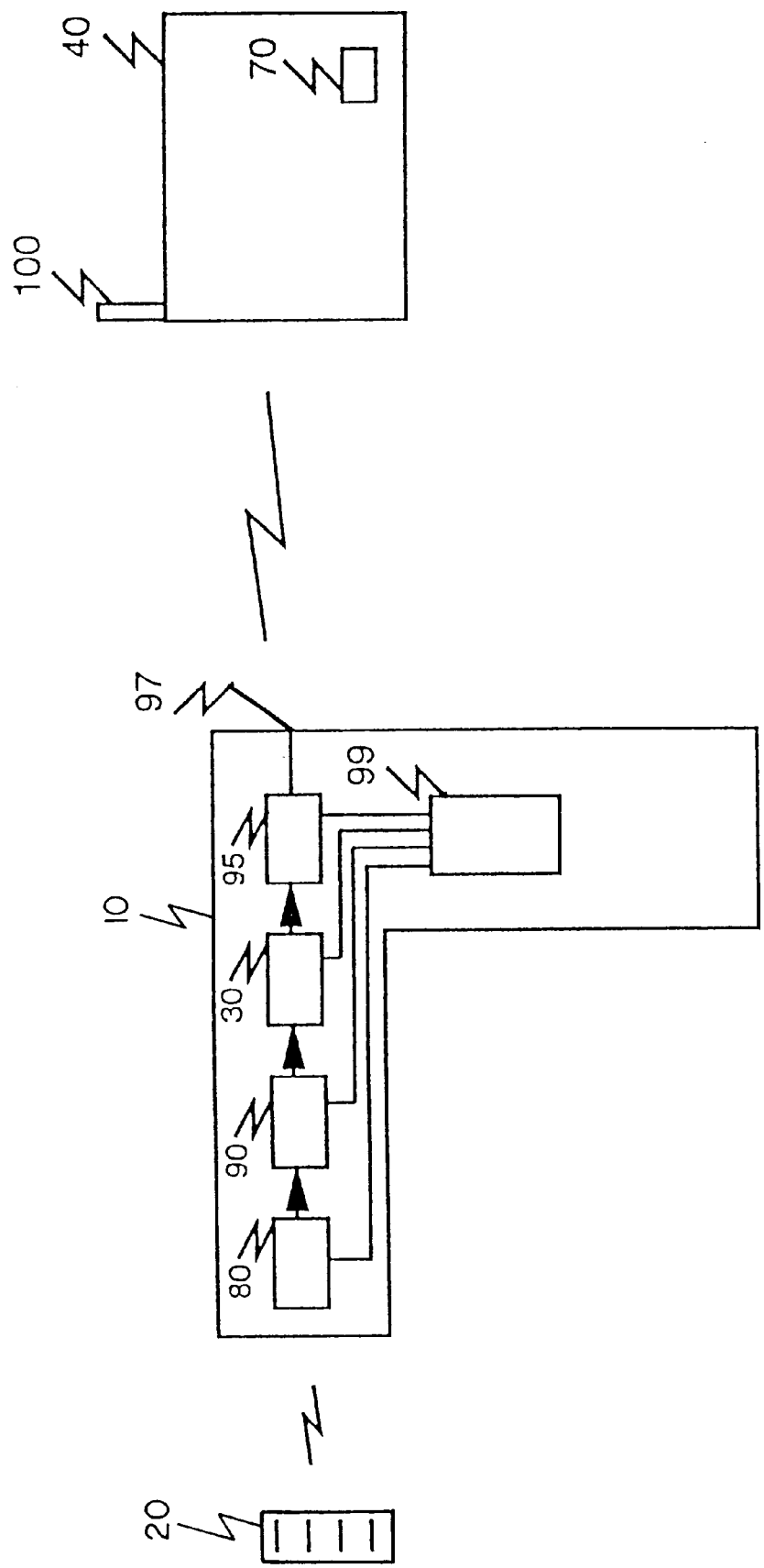
FIG. 2 is a diagram showing a second embodiment of the invention with a remote bar code scanner and a personal computer with an antenna mounted on its external housing.

The means for receiving the raw bar code data over-the-air may be accomplished by other means, such as by an antenna 100 mounted on a housing, for example, the outer housing of the personal computer 40, as shown in FIG. 2. The antenna 100 is configured to receive signals within a particular frequency band that corresponds to the frequency band which the raw bar code data is sent by the bar code scanner 10.

A handshaking scheme may also be utilized with the system according to the invention, in which the personal computer 40 sends an acknowledgement signal to the bar code scanner 10 once it has successfully received the raw bar code data. If the received data is corrupted for some reason, however, the personal computer 40 will send a "resend data" signal to the bar code scanner 10, in which case the bar code scanner 10 will resend the raw, digitized bar code data that is currently stored in its internal memory 30. Once the bar code scanner 10 has received an acknowledgement signal, it can then write over the raw, digitized bar code data that has been successfully received (and acknowledged) by the personal computer 40. Until it receives the acknowledgement signal, however, the bar code scanner 10 cannot erase or write over the digitized bar code data that is stored in its internal memory 30.

In the first embodiment as shown in FIG. 1, the personal computer 40 receives data via the receiver board 50 connected to an expansion slot 60 on the personal computer 40, and the received, raw bar code data is demodulated, and then decoded by software resident in the personal computer 40. Such software may include application programs, which are resident, for example, in read-only memory (ROM) 70 internal to the personal computer 40. The software may be updated as needed, by either replacing a memory board in which the ROM 70 is resident on, or by the sending of a signal to the personal computer 40 via a wired (i.e., keyboard entry) or wireless connection (i.e., via a signal received by the receiver board 50). Once received, the signal will cause a different application program resident in another memory region of the memory 70 to be used by the personal computer 40.

Figure 3:
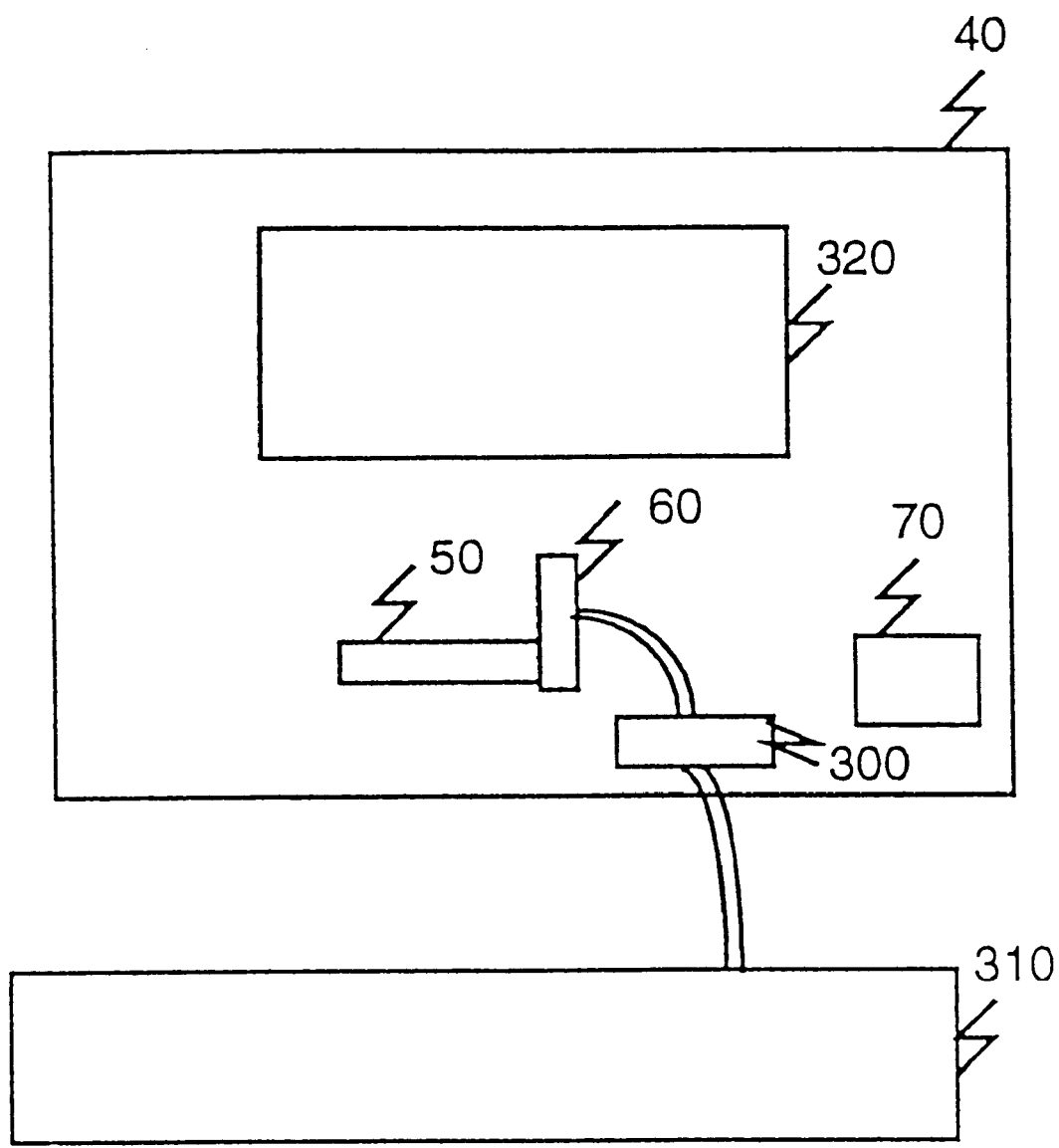
FIG. 3 is a diagram showing the keyboard and the keyboard buffer of the personal computer.

Once the raw bar code data has been demodulated and decoded by use of the resident software in the memory 70 of the personal computer 40, the decoded data can then be used for various purposes. One useful purpose for the decoded bar code data is to place the data into a keyboard buffer 300 of the personal computer 40, as shown in FIG. 3, in order to simulate data from the keyboard as determined by the decoded bar code data. The data is sent to the keyboard buffer 300 via a data bus 330. Once the data from the keyboard is simulated, it can be used to display the data on a display 320 on the personal computer 40, so as to be able to see what the currently scanned data corresponds to. Alternatively, the data can be used as input to a program being run on the personal computer which accepts keyboard-entered data. By use of the system according to the invention, the program is "faked out" so as to accept the scanned bar code data that is sent to the keyboard buffer to make it appear as if that data was entered via a keyboard operator.

While the bar code data may be placed in the keyboard buffer, alternatively, another set of data from the keyboard, corresponding to the bar code data, may be placed in the keyboard buffer. For example, based on a table lookup procedure, a bar code symbol with bar code characters "123" would cause characters "ABC" to be placed in the keyboard buffer.

The system according to the invention is useful, for example, when a program currently being executed by the personal computer 40 performs certain operations based on keyboard entries from a keyboard connected to the personal computer 40. In this case, the system according to the invention allows for keyboard entries to be made via the data sent from the bar code scanner to a keyboard buffer for the keyboard, without any need for an operator to input that data. This allows for an automated entry of data directly from the bar code scanner to a program that is being run on the personal computer 40 and that is set up to receive data entry via the keyboard of the personal computer 40.

One such situation in which the invention is useful corresponds to a program being executed by the personal computer that computes a cumulative price of various bar-coded products. The program receives keyboard entries for the bar codes of each of the products, and from these entries, performs a look-up function (via a lookup table stored in internal memory 70 of the personal computer 40) to determine the current price of each of the products. The current price of each product is summed to obtain a total cost. With the invention as describe herein, however, there is no need for an operator to enter in the bar codes, since the bar code of each product scanned by the bar code scanner 10 is automatically sent to a keyboard buffer 300 of a keyboard 310 connected to the personal computer 40, by way of the receiver expansion board 50, as shown in FIG. 3. All that is required by the personal computer 40 is software that converts the received bar code data into data from the keyboard, which are sent to and stored in the keyboard buffer 300.

Referring back to FIG. 1, with the receiver board 50 situated in an expansion slot 60 of the personal computer 40, there is no need for interface cables between the receiving means (i.e., the receiver board expansion slot 60) and the personal computer 40 itself. Also, with respect to the embodiment shown in FIG. 2, there need only be an internal connection of the antenna 100 to the processing and decoding circuitry (not shown) internal to the personal computer 40. The internal connection may be performed via conventional ways, such as a twisted pair connection, a coaxial cable, or the like.

While embodiments have been described herein, modification of the described embodiments may become apparent to those of ordinary skill in the art, following the teachings of the invention, without departing from the scope of the invention as set forth in the appended claims.

For example, the scanned bar code data received may be sent by the bar code scanner in an non-digitized form to the personal computer. In this embodiment, the data is first demodulated, and then sent to an analog-to-digital converter before it is decoded. The decoded data is then sent to the keyboard buffer of the keyboard. This embodiment allows for less components at the remote bar code scanner (i.e., no need for a digitizer or a memory at the bar code scanner).

Also, the scanned bar code data can be converted to data from the keyboard by use of a simple table look up internal to the bar code scanner itself. In this case, the data is sent over-the-air to the personal computer, whereby the expansion board sends the data directly to the keyboard buffer, without any need for conversion processing of the bar code data by the personal computer.

What is claimed is:

1. A bar code scanning and decoding apparatus comprising:

a bar code scanner, which includes,
 a scanner configured to scan a bar code symbol;
 a transmitter configured to transmit a signal corresponding to the scanned bar code symbol via over-the-air transmission; and
 a storage unit,
 wherein the scanner retains the signal in the storage unit until the acknowledgement signal is received from the computer, and
a computer located separate from the bar code scanner, the computer including,
 a receiver configured to receive the signal sent from the bar code scanner and to convert the signal to digital information; and
 a computer program configured to receive the digital information from the receiver and to be executed by the computer based on the digital information,
wherein the computer sends an acknowledgement signal to the scanner when the computer has successfully received the signal,
wherein the computer receives the signal sent from the bar code scanner in a time division manner, and
wherein the signal is allowed to be erased or overwritten in the storage unit once the acknowledgement signal is received from the computer.

2. A method of decoding a bar code, comprising the steps of:

a) scanning the bar code;
b) transmitting, from a first location, a signal corresponding to the scanned bar code via over-the-air transmission;
c) receiving, at a second location separate from the first location, the signal sent via the over-the-air transmission;

d) converting, at the second location, the signal sent via the over-the-air transmission into a digital data stream;

e) executing, at the second location, a computer program based on the digital data stream;

f) if the converting performed during the converting step d) is successful, sending an acknowledgement signal from the second location to the first location; and g) maintaining the signal at the first location until the acknowledgement signal is received at the first location, wherein the transmission step b) is performed in a time division multiple access fashion between the first location and the second location.

\* \* \* \* \*